Oct. 28, 1969   J. H. BROADHEAD ETAL   3,474,832
APPARATUS FOR SEALING PIPE FROM WITHIN
Filed Jan. 30, 1967
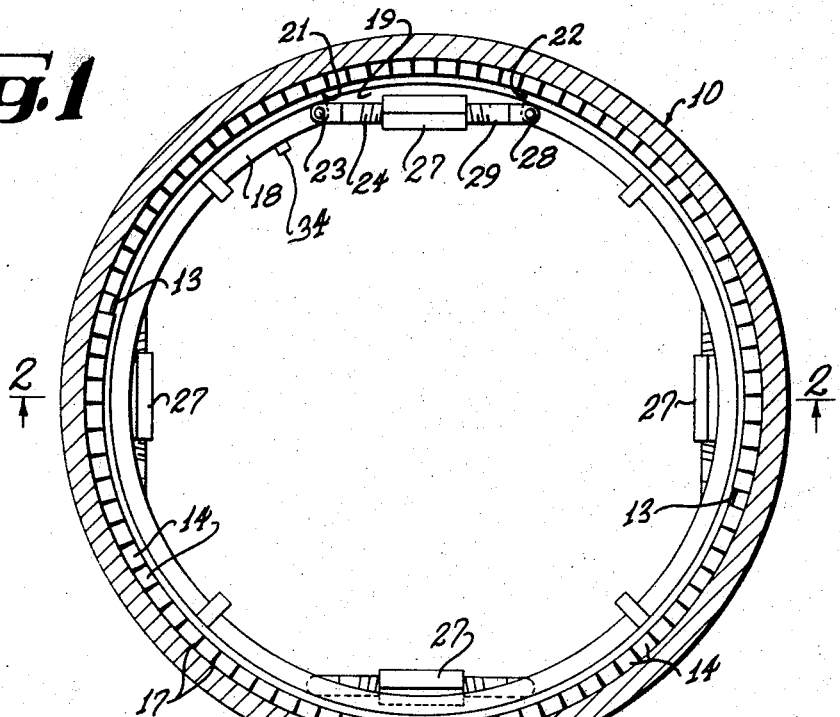
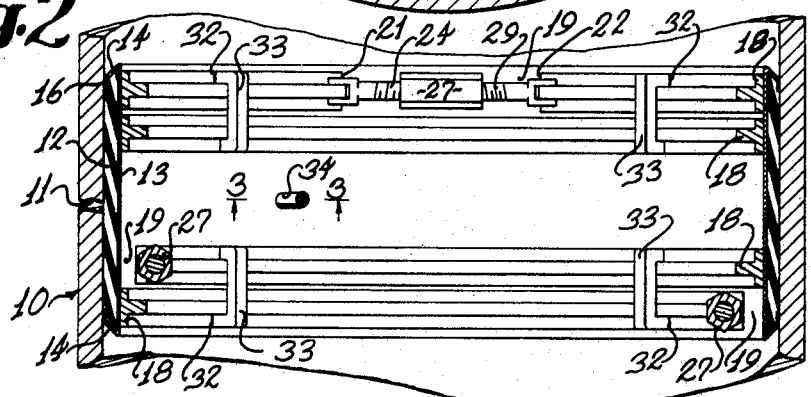
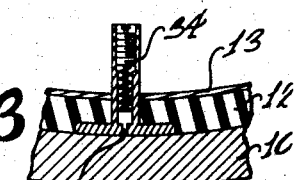
INVENTOR.
James H. Broadhead
BY James E. Hamilton
Jennings, Carter & Thompson
Attorneys

United States Patent Office 3,474,832
Patented Oct. 28, 1969

3,474,832
APPARATUS FOR SEALING PIPE FROM WITHIN
James H. Broadhead and James E. Hamilton, both c/o Utility Tool Company, 1713 Lomb Ave., Birmingham, Ala. 35208
Filed Jan. 30, 1967, Ser. No. 612,634
Int. Cl. F16l 55/18
U.S. Cl. 138—97                              8 Claims

ABSTRACT OF THE DISCLOSURE

Apparatus for sealing pipe from within having an annular, resilient seal disposed to engage the inner wall of a pipe and span the area to be sealed. An extendable sleeve fits within the resilient seal and encases the ends thereof to confine outward movement of the seal. Extendable pressure rings engage the inner surface of the sleeve to exert radial pressure thereagainst at opposite sides of the area to be sealed.

BACKGROUND OF THE INVENTION

Heretofore in the art to which our invention relates, difficulties have been encountered in sealing pipe, such as gas mains, from within due to the fact that sealing units heretofore employed have attempted to force the sealing material into the cavity to be sealed. Also, such sealing units heretofore employed have required complicated clamping mechanisms which employ many separate parts which must be bolted to each other to exert pressure against the sealing apparatus. Difficulties have also been encountered in forming an effective seal due to the fact that the sealing material is not only forced toward an irregular cavity but the sealing material has heretofore been urged in a direction generally axially of the pipe.

It is very desirable to seal pipe, such as gas mains, from the inside due to the fact that it not only saves time and expense but eliminates the necessity of having to cut openings in streets and the like which cause great inconveniences to the public. Also, to install a clamp around the exterior of a pipe necessitates the removal of a considerable amount of earth surrounding the pipe and requires a thorough cleaning of the pipe.

BRIEF SUMMARY OF THE INVENTION

In accordance with our invention, we provide an annular, resilient seal member of a size to engage the inner surface of a pipe and extend across the area to be sealed. An extendable sleeve is mounted within the resilient seal member with end portions of the sleeve extending outwardly and then inwardly in position to engage the inner surface of the pipe and thus confine the ends of the resilient seal against outward movement. Extendable pressure rings are mounted within the sleeve in position to engage the inner surface thereof at opposite sides of the area to be sealed whereby radial compressive forces are applied against the sleeve and the resilient seal to form an effective seal. Accordingly, the seal is made against a solid, inner portion of the pipe rather than at a cracked area or at a joint where uneven surfaces are encountered. The size or shape of the area to be sealed is no obstacle in making an effective seal in accordance with our invention.

Apparatus embodying features of our invention is illustrated in the accompanying drawing, forming a part of this application, in which:

FIG. 1 is a vertical sectional view through a pipe having our improved apparatus mounted on the inner surface thereof;

FIG. 2 is a sectional view taken generally along the line 2—2 of FIG. 1;

FIG. 3 is an enlarged, fragmental view taken generally along the line 3—3 of FIG. 2;

FIG. 4 is an enlarged, fragmental view showing overlapping sections of the metal sleeve member; and FIG. 5 is a sectional view through the nut-like member for the extendable unit for the pressure rings.

Referring now to the drawing for a better understanding of our invention, we show a pipe 10, such as a gas main, having a cracked area 11 to be sealed, as shown in FIG. 2. While we have shown the area 11 to be sealed as being a cracked area, it will be apparent that the area could be at a point where two pipe sections join each other.

To form the seal within the pipe 10, we provide an annular, resilient seal member 12 of a size to engage the inner surface of the pipe 10 and span the area 11 to be sealed. Fitting within the resilient seal member 12 is an extendable sleeve 13 which is formed of a suitable sheet material, such as metal. The sleeve 13 extends the entire length of the resilient seal member 12, as shown in FIG. 2 and the end portions of the sleeve 13 extend outwardly as at 14 and then inwardly as at 16 in position to engage the inner surface of the pipe 10 and thus confine the ends of the resilient seal member 12 against outward movement. As shown in FIGS. 1 and 4, the end portions 14 and 16 are provided with a plurality of slits 17 which are spaced angularly around the entire sleeve member 13. In FIG. 1 of the drawing, we show the sleeve member 13 as comprising two sections which overlap each other, as shown in FIG. 4. Preferably, the outwardly and inwardly extending end portions of the sleeve member 13 are eliminated from one section adjacent the end thereof, as shown in FIG. 4, to facilitate sliding movement of the sleeve members 13 relative to each other.

To urge the sleeve member 13 and the resilient seal member 14 into sealing engagement with the inner surface of pipe 10, we mount extendable pressure rings 18 inwardly of the sleeve member 13 at opposite sides of the area 11 to be sealed. Each pressure ring 18 is split so as to provide a gap 19 between adjacent ends 21 and 22 of the pressure ring 18, as shown in FIG. 1. Pivotally connected to the end 21 of ring 18 by a pivot pin 23 is one end of a threaded member 24 having left-hand threads thereon which are adapted to engage left-hand threads 26 provided in the adjacent end of a nut-like member 27. Pivotally connected to the end 22 of the pressure ring 18 by a pivot pin 28 is one end of a threaded member 29 having right-hand threads thereon which are adapted to engage a right-hand threaded portion 31 in the nut 27, as shown in FIG. 5. Upon rotation of the nut-like member 27 in opposite directions, the pressure ring 18 is extended and contracted, respectively.

As shown in FIG. 2, we provide a pair of pressure rings 18 at opposite sides of the area 11 to be sealed with the gap 19 in one pressure ring 18 spaced angularly from the gap in the adjacent pressure ring 18. In FIGS. 1 and 2 of the drawing, we show the nut-like members 27 of adjacent extendable units for the pressure rings as being directly opposite each other or 180° from each other.

Secured to one pressure ring 18 of each pair of adjacent pressure rings, as at 32 is a retaining element 33 which is adapted to extend over the adjacent pressure ring 18 and then alongside the adjacent surface thereof to thus connect the adjacent pressure rings 18 of each pair of pressure rings to each other, as shown in FIG. 2. By providing the retaining elements 33, the adjacent pressure rings 18 of each pair are held in parallel alignment with each other whereby a uniform pressure is exerted against the inner surface of sleeve member 13 directly opposite the clamping rings 18.

By spacing the gaps 19 of adjacent pressure rings 18 angularly from each other, as shown in FIGS. 1 and 2, the gaps 19 are never in alignment with each other thus providing an effective seal at each side of the area 11 to be sealed. That is, one pressure ring 18 exterts a continuous force against the inner surface of the sleeve 13 with the exception of the gap 19 whereas the other pressure ring 18 adjacent thereto exerts a continuous sealing force against the inner surface of the sleeve 13 over the entire area covered by the gap 19 of the first mentioned pressure ring 18. Accordingly, adjacent pressure rings 18 of each pair of pressure rings must be so mounted relative to each other that the gaps 19 therein are spaced angularly from each other to assure that there is a complete seal at each side of the area 11 to be sealed.

To test the area sealed, we provide an air valve 34 which communicates with a passageway 36 provided through the sleeve 13 and the resilient member 12, as shown in FIG. 3, whereby air under pressure may be introduced between the resilient member 12 and the inner surface of pipe 10. Soapy water is then applied around the sealed area in a manner well understood in the art, to determine whether or not there is any leakage.

From the foregoing description, the operation of our improved apparatus for sealing pipe from within will be readily understood. To position the resilient member 12 and the sleeve member 13 within the pipe 10, the sleeve 13 and resilient member 12 are distorted or folded in a generally S shape so as to provide ample clearance for moving the unit into the pipe 10. It will be understood that the ends of the sleeve 13 are bent outwardly as at 14 and then inwardly as at 16 prior to inserting the unit in the pipe. The resilient sealing member 12 is positioned over the area 11 to be sealed whereby the end portions 14 and 16 are spaced substantially equal distances from the opening 11, thus positioning the end portions of the resilient member 12 directly opposite solid inner portions of the pipe 10 whereby a continuous and uniform seal may be provided therebetween.

With the sleeve 13 and resilient member 12 thus positioned, the pressure rings 18 are positioned inwardly of the sleeve 13 whereby a pair of pressure rings 18 are placed adjacent each end of the sleeve 13. The retaining elements 33 are carried by one pressure ring 18 and inserted over the adjacent pressure ring 18 whereby adjacent rings of each pair are secured to each other, as shown in FIG. 2, to thus maintain parallel alignment of the pressure rings relative to each other. The gap 19 and one pressure ring 18 of each pair of pressure rings is positioned angularly from the gap 19 in the adjacent pressure ring, as shown in FIG. 2, whereby the arcuate portion not clamped by the gap in one pressure ring is clamped by the continuous clamping surface of the pressure ring adjacent thereto. Preferably, the pressure rings 18 are so positioned that the gaps 19 of adjacent rings 18 are 180° from each other.

With the pressure rings 18 thus installed within the sleeve 13, the nut-like members 27 are rotated in the proper direction to cause the ends 21 and 22 of each clamping ring 18 to move away from each other and into clamping engagement with the sleeve member 13 whereby radial compressive forces are applied to the sleeve 13 and the resilient sealing member 12. The outwardly extending portions 14 and inwardly extending portions 16 at each end of the sleeve 13 confine the resilient sealing member 12 whereby there is no movement of the resilient material 12 outwardly of the end portions 14 and 16. After moving the pressure rings 18 into clamping engagement with the sleeve member 13, air under pressure is introduced through valve 34 through openings 36 and soapy water is applied to the surrounding areas of the clamping apparatus in a manner will understood in the art to determine whether or not a proper seal has been made.

From the foregoing, it will be seen that we have devised improved apparatus for sealing pipe from within. By providing a sealing member which spans the area to be sealed and then forming an effective seal at opposite sides of the area to be sealed, the seal is made at a continuous, solid portion of the inner surface of the pipe whereby the size and shape of the area to be sealed does not interfere with a proper seal being made. By providing angularly spaced slits in the end portions of the inner sleeve member, the end portions may be readily bent outwardly and then inwardly to limit outward movement of the seal member 12 and at the same time the sleeve member 13 is flexible whereby it may be distorted into a generally S shape for movement into the pipe. Furthermore, by providing a pair of pressure rings at opposite sides of the area to be sealed whereby the gap left by one pressure ring is spaced angularly from the gap left by the other pressure ring adjacent thereto, a continuous and effective seal is provided around the entire inner surface of the sleeve 13 as opposite sides of the area to be sealed.

While we have shown our invention in but one form, it will be obvious to those skilled in the art that it is not so limited, but is susceptible of various other changes and modifications without departing from the spirit thereof.

What is claimed is:

1. Apparatus for sealing pipe from within comprises,
   (a) an annular, resilient seal member of a size to engage the inner surface of pipe and span the area to be sealed,
   (b) an extendable sleeve within said resilient seal member embodying arcuate sections of sheet metal with adjacent edges thereof overlapping each other,
   (c) end portions on said sleeve extending outwardly and then inwardly in position to engage the inner surface of the pipe and confine the ends of said resilient seal against movement outwardly of said sleeve, and
   (d) extendable pressure rings disposed to engage the inner surface of said sleeve and exert radial compressive forces thereagainst at opposite sides of the area to be sealed.

2. Apparatus for sealing pipe from within as defined in claim 1 in which said end portions of the extendable sleeve are provided with a plurality of angularly spaced slits therein so that said end portions are bendable outwardly and then inwardly to encase the ends of said resilient seal member and engage the inner surface of the pipe.

3. Apparatus for sealing pipe from within as defined in claim 1 in which each extendable pressure ring is a split ring having a gap therein and the ends of said ring adjacent said gap are adjustably connected to each other by an extendable unit.

4. Apparatus for sealing pipe from within as defined in claim 3 in which the extendable unit comprises:
   (a) at least one elongated threaded member pivotally connected to at least one end of said split ring, and
   (b) a rotatable nut-like member having internal threads for receiving said threaded member.

5. Apparatus for sealing pipe from within as defined in claim 4 in which an elongated threaded member is pivotally connected to each end of said split ring with one elongated threaded member having right-hand threads thereon and the other elongated threaded member having left-hand threads thereon and said nut-like member is provided with right-hand threads adjacent one end thereof and left-hand threads adjacent the other end thereof for receiving said elongated threaded members so that said pressure ring is extended and contracted respectively upon rotation of the nut-like member in opposite directions.

6. Apparatus for sealing pipe from within as defined in claim 1 in which a pair of extendable pressure rings are provided adjacent each end of said sleeve with adjacent pressure rings of each pair having gaps therein which are spaced angularly from each other, and an extendable unit adjustably connects the ends of each pressure ring to each other.

7. Apparatus for sealing pipe from within as defined in claim 6 in which a retaining element is carried by one pressure ring of each pair of pressure rings in position to engage the other pressure ring of said pair so that the pressure rings of each pair are connected to each other.

8. Apparatus for sealing pipe from within as defined in claim 1 in which a passageway is provided through said sleeve and said resilient seal member, and a valve communicates with said passageway for supplying testing air through said passageway.

References Cited
UNITED STATES PATENTS

| | | | |
|---|---|---|---|
| 419,995 | 1/1890 | Rankin | 138—97 X |
| 2,672,162 | 3/1954 | Braver | 138—97 |
| 3,667,967 | 8/1966 | Guthrie | 138—97 |

PATRICK D. LAWSON, Primary Examiner